United States Patent [19]
Koeper

[11] 3,790,934
[45] Feb. 5, 1974

[54] BATTERY OPERATED MOTOR VEHICLE LAMP WARNING FLASHING CIRCUIT

[75] Inventor: John I. Koeper, New Bremen, Ohio

[73] Assignee: Crown Controls Corporation, New Bremen, Conn.

[22] Filed: Sept. 5, 1972

[21] Appl. No.: 286,030

[52] U.S. Cl............. 340/81 R, 180/65 R, 307/10 R
[51] Int. Cl............................................... B60q 1/46
[58] Field of Search........... 340/81 R; 307/10 R, 93; 180/65 R; 317/31; 323/22 Z

[56] References Cited
UNITED STATES PATENTS

| | | | |
|---|---|---|---|
| 3,373,316 | 3/1968 | Palmer | 180/65 R |
| 3,631,359 | 12/1971 | Jones | 340/81 R |
| 3,514,622 | 5/1970 | Costa et al. | 340/70 |
| 3,585,444 | 6/1971 | Crowley | 315/240 |

*Primary Examiner*—John W. Caldwell
*Assistant Examiner*—Glen R. Swann III
*Attorney, Agent, or Firm*—Biebel, French & Bugg

[57] ABSTRACT

In a battery operated motor vehicle, a warning lamp flasher circuit is provided which includes a free running multivibrator for determining the lamp flashing rate, switch means for controlling current through the warning lamp, a regulated power supply for establishing a regulated voltage for the multivibrator and to suppress any positive transients which may be generated by the vehicle motor control system, and a circuit for suppressing negative voltage transients exceeding a predetermined value.

2 Claims, 4 Drawing Figures

PATENTED FEB 5 1974 3,790,934

BATTERY OPERATED MOTOR VEHICLE LAMP WARNING FLASHING CIRCUIT

BACKGROUND OF THE INVENTION

Many battery operated vehicles, such as lift trucks, are required to have a warning light which flashes continuously when the ignition key is turned on. In the prior art, these lamp flashers are usually mechanical devices, but these devices have the disadvantage of a limited life and a high failure rate.

Some attempts have been made to provide a solid state flasher for use in this environment, but these attempts have failed due to the transient voltages developed on the main battery supply by the motor control circuits. These motor control circuits frequently use gate controlled devices such as silicon controlled rectifiers. The transient voltages developed by these motor control circuits interfere with the normal operation of the flasher control circuit by causing the warning lamp to flash at irregular and/or undesirable intervals.

SUMMARY OF THE INVENTION

This invention relates to a solid state flasher circuit which is useful particularly for controlling the flashing of a warning lamp mounted on a motor powered vehicle, such as a lift truck.

More particularly, the flashing circuit of this invention includes a free running multivibrator for controlling the rate at which the lamp is flashed and a transistorized switching circuit for controlling the current through the flashing lamp in response to the output of the multivibrator. Two voltage regulating circuits are provided, one of which supplies a regulated voltage lower than the supply voltage from the vehicle and which also functions to limit or clip any positive transient voltages which are impressed on the vehicle power supply by the motor or associated control circuitry. A second regulating circuit includes a Zener diode for limiting negative transient voltages which may be impressed on the vehicle power supply circuit.

It is therefore an object of this invention to provide an improved flashing circuit which may be used in those environments where transient voltages on the main power supply would otherwise cause irregular or undesirable flashing of a warning lamp; to provide an improved solid state flashing circuit which includes two voltage limiting circuits, one of which functions to limit positive transient voltages and the other of which functions to limit negative voltage transients; and to provide an improved flashing circuit which includes a multivibrator, a regulated power supply including a resistor in series with the main power source, a Zener diode in series with the resistor, and a capacitor in parallel with the Zener diode, the voltage across the Zener diode being the regulated voltage supplied to the multivibrator, and a second voltage regulating device including a Zener diode and to limit negative going transients.

Other objects and advantages of the invention will be apparent from the following description, the accompanying drawings and the appended claims.

DESCRIPTION OF THE PREFERRED EMBODIMENT

Figure 1:
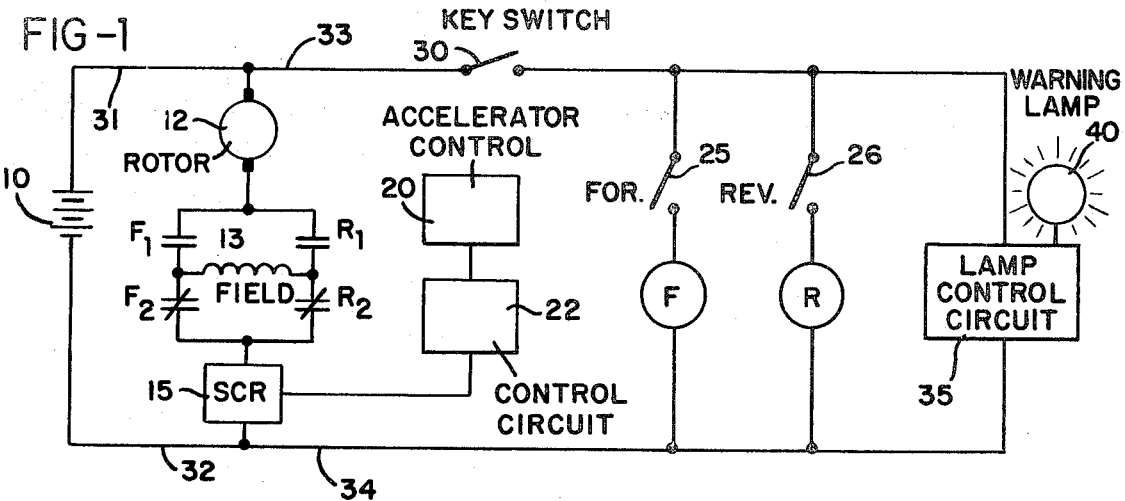
FIG. 1 is an electrical schematic diagram of a battery operated motor vehicle control circuit including the flashing lamp circuit of this invention.

Referring now to the drawings which show the preferred embodiment of the invention, and particularly to FIG. 1, a motor vehicle control circuit is shown which includes a main battery 10 for supplying power to a series wound motor which includes a rotor 12 and a field winding 13 in series with an SCR device 15. The magnitude of the current through the motor is determined by the position of accelerator control 20 which controls a control circuit 22 and thus controls the current through the SCR device 15.

The direction of vehicle travel is controlled by "forward" switch 25 or a "reverse" switch 26. Switches 25 and 26 control relays or contactor devices F and R, respectively. Thus, when switch 25 is closed relay F is energized, thus closing the normally open contacts F1 and allowing current to flow through the field winding 13 from left to right, as viewed in FIG. 1, and through the normally closed contacts R2 of relay R. Similarly, when switch 26 is closed, relay R is energized and current will flow through the normally open contacts R1, the field winding 13 from right to left, and normally closed contacts F2.

Power to relays F and R is supplied through an ignition switch 30. This arrangement enables the cables 31 and 32, which interconnect the battery with the motor circuit, to be of short length and of large current carrying capacity while the cables 33 and 34, which supply current to the relays F and R, may be of longer length and of less current carrying capacity.

Also connected to cables 33 and 34 through switch 30 is the warning lamp control circuit 35 which controls the current to warning lamp 40. According to some safety regulations, this warning lamp must flash whenever the ignition switch 30 is turned on.

The SCR device used in the SCR circuit 15, as well as the large inductance of the motor rotor 12 and field winding 13, cause transient voltages to be developed, and these voltages will appear on cables 33 and 34. Waveforms of the voltages which appear on these cables are shown in FIGS. 2 and 3.

Figure 2:
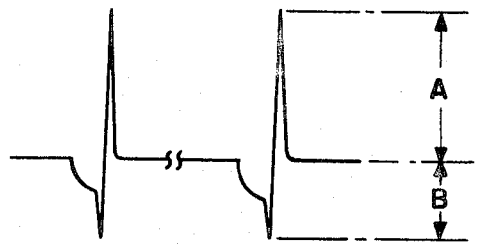
FIG. 2 is a waveform showing the positive and negative transient voltages appearing on the battery power supply at the slowest speed of operation of the vehicle motor.

FIG. 2 represents the transient voltages which appear on cables 33 and 34 when the motor control circuit is operating the motor at the lowest speed. The SCR device 15 typically controls the average current through the motor and does this by controlling the time duration of current flow through the motor. In other words, the current flow is either on or off, and the ratio of "on" time to "off" time will determine the average power available to the motor and thus its speed of rotation. With a 24 volt battery 10, the maximum positive transient voltage A shown in FIG. 2 is approximately 13 volts while the negative transient voltage B is approximately six volts. The rate at which these positive and negative transients occur at the lowest motor speed is approximately fifty cycles per second in the example shown.

Figure 3:
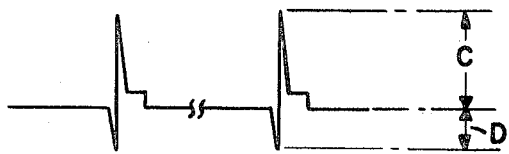
FIG. 3 is a waveform showing the positive and negative transient voltages appearing on the battery power supply during operation of the vehicle motor at its fastest speed.

In FIG. 3, a waveform representing the transient voltages appearing on cables 33 and 34 is shown when the motor is operated at its maximum speed, with the transients appearing at the rate of approximately 180 cycles per second. Again, using a battery voltage of 24 volts, the positive transient C is approximately five volts while the negative transient D is approximately two volts.

The positive transient voltages A and C cause many solid state flashing circuits to flash or trigger at odd intervals which are more related to the speed of the vehicle than to the flashing rate determined by the flashing circuit 35. This is undesirable because the flashing rate is not fixed and will vary depending upon the conditions under which the vehicle is operated, and in fact may cause the lamp to flash at such a high rate that it will appear to be continuously illuminated.

Figure 4:
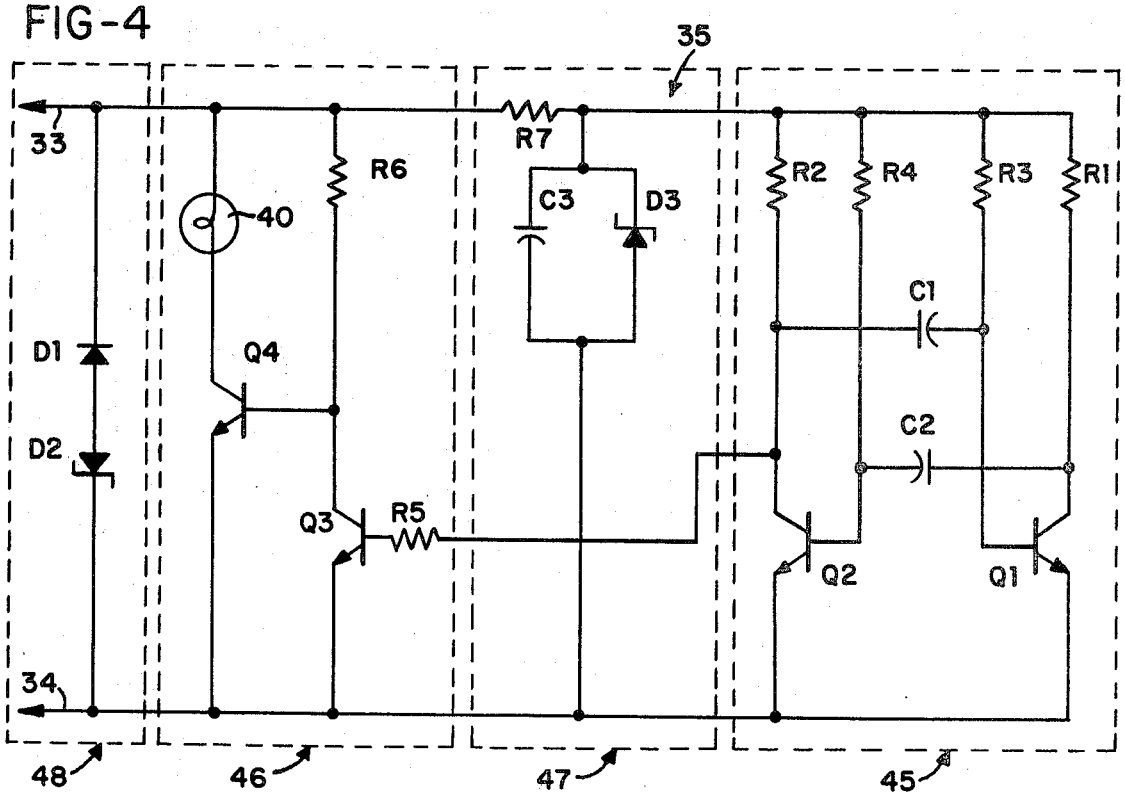
FIG. 4 is an electrical schematic diagram of the flashing control circuit constructed according to this invention.

These transient voltages are suppressed in the present invention and therefore do not interfere with the operation of the flashing circuit shown in FIG. 4. The flashing circuit in FIG. 4 may be divided into four basic circuits including an astable multivibrator 45, a switching circuit 46, a regulated power supply 47 and a negative voltage transient suppressor 48.

The astable multivibrator 45 includes transistors Q1 and Q2, resistors R1, R2, R3 and R4 and capacitors C1 and C2. The multivibrator shown in FIG. 4 oscillates at a frequency of fifty to sixty cycles per minute.

The output of the multivibrator is coupled to the switch 46 through resistor R5. The switch 46 includes transistors Q3 and Q4 and resistors R5 and R6. When transistor Q2 is on, its collector voltage is approximately 0.3 volts. Transistor Q3 requires about 0.6 volts to gate it on, and therefore transistor Q3 is off and current will flow through R6 and the base electrode of Q4 gating Q4 on and causing the lamp 40 to be illuminated.

When transistor Q2 is off, current will flow through resistors R2 and R5 to the base of transistor Q3 gating it on and gating transistor Q4 off to extinguish the lamp 40.

The multivibrator 45 is supplied with a regulated voltage through the regulated power supply 47 which includes resistor R7, Zener diode D3 and capacitor C3. With a battery voltage of 24 volts across cables 33 and 34, and with a Zener diode D3 which regulates the voltage at 20 volts, approximately four volts will be dropped across resistor R7. Capacitor C3 and resistor R7 also act as an integrating circuit which limits the positive going transients to prevent these transients from adversely effecting the operation of the multivibrator 45.

The negative voltage suppressor circuit 48 includes diode D1 and Zener diode D2. This protection circuit limits the negative voltage transients to 56 volts, thereby also providing protection to the multivibrator circuit 45 from the large transients developed on opening switches 25 and 26 to contactor coils F and R. Contactor coils F and R have suppressor circuits normally built into them to limit the voltage output when the coils are turned off from about 75 to 100 volts. In the event that contactors are used which do not include built in voltage suppressors, the negative transient suppressor circuit 48 will protect the flashing circuit. The negative transients do not normally trigger the multivibrator, and therefore protection against negative transients is not specifically required for that purpose.

The following are typical values for the components used in the circuit shown in FIG. 4.

Q1, 2, 3 — 2N3416
Q4 — D44C7
D1 — A-14A
D2 — VR-56
D3 — VR-20
R1, R2 — 4.7 K ohms
R3, R4 — 47 K ohms
R5 — 2.2 K ohms
R6 — 470 K ohms
R7 — 470 K ohms
C1, C2 — 20 mfd, 30 volt
C3 — 50 mfd, 25 volt
Lamp 40 — 24 volt, 1 ampere, No. 1638 lamp.

Thus, a solid state circuit for controlling the flashing rate of a warning lamp for use on motor controlled vehicles has been described.

While the form of apparatus herein described constitutes a preferred embodiment of the invention, it is to be understood that the invention is not limited to this precise form of apparatus, and that changes may be made therein without departing from the scope of the invention, which is defined in the appended claims.

What is claimed is:

1. A battery powered vehicle including
   a battery,
   an electric motor,
   a gate controlled device for controlling the average current from said battery through said motor,
   switch means for controlling the direction of current flow from said battery through said motor thereby to control the direction of movement of the vehicle,
   a warning lamp mounted on said vehicle,
   multivibrator means for determining the flashing rate of said warning lamp,
   means responsive to said multivibrator means for controlling current from said battery through said lamp, and
   means for suppressing the transient voltages caused by said gate controlled device as it controls the average current through said motor to prevent said multivibrator means from being inadvertently triggered by said transient voltages including a regulated power supply for supplying a regulated voltage to said multivibrator means, said power supply including a resistor, a Zener diode in series with the resistor, and a capacitor in parallel with said Zener diode.

2. In the vehicle of claim 1, said switch means comprising a relay, the coil of which is energized upon the closure of an electrical contact, and
   means for suppressing the transient voltages generated when said relay coil is disconnected from said battery, said means including a diode in series with a Zener diode for dissipating transient voltages exceeding a predetermined value as determined by said Zener diode.

* * * * *